United States Patent
Miyake (10) Patent No.: US 7,290,644 B2
(45) Date of Patent: Nov. 6, 2007

(54) VIBRATION ABSORBER WITH DYNAMIC DAMPER

(75) Inventor: Kazuo Miyake, Okayama (JP)

(73) Assignee: Kurashiki Kako Co., Ltd., Okayama (JP)

( * ) Notice: Subject to any disclaimer, the term of this patent is extended or adjusted under 35 U.S.C. 154(b) by 171 days.

(21) Appl. No.: 11/149,536

(22) Filed: Jun. 10, 2005

(65) Prior Publication Data

US 2006/0214339 A1    Sep. 28, 2006

(30) Foreign Application Priority Data

Mar. 23, 2005  (JP) .............................. 2005-083495

(51) Int. Cl.
*F16F 7/10* (2006.01)
(52) U.S. Cl. .................. 188/379; 267/140.12
(58) Field of Classification Search ................ 188/378, 188/379, 380, 140.12
See application file for complete search history.

(56) References Cited

U.S. PATENT DOCUMENTS

| | | | | |
|---|---|---|---|---|
| 3,667,706 A | * | 6/1972 | Tiberghien | 248/559 |
| 4,403,762 A | * | 9/1983 | Cogswell et al. | 248/559 |
| 4,456,213 A | * | 6/1984 | Fukushima et al. | 248/559 |
| 4,619,349 A | * | 10/1986 | Braun | 188/380 |
| 5,052,530 A | * | 10/1991 | Shimazaki | 188/379 |
| 5,080,332 A | * | 1/1992 | Yoda et al. | 267/140.12 |
| 5,156,380 A | * | 10/1992 | Cerruti et al. | 267/293 |
| 5,702,524 A | * | 12/1997 | Finnicum et al. | 118/200 |
| 5,950,778 A | * | 9/1999 | Mahoney et al. | 188/378 |
| 6,216,833 B1 | * | 4/2001 | Lefferts et al. | 188/380 |
| 6,321,890 B1 | * | 11/2001 | Suzuki et al. | 188/379 |
| 6,397,988 B1 | * | 6/2002 | Ptak | 188/380 |
| 6,439,359 B1 | * | 8/2002 | Kato et al. | 188/379 |
| 6,536,567 B2 | * | 3/2003 | Nakanishi | 188/378 |
| 6,675,793 B1 | * | 1/2004 | Saunders | 124/89 |
| 6,725,985 B2 | * | 4/2004 | Haneishi et al. | 188/379 |
| 6,736,246 B2 | * | 5/2004 | Haneishi et al. | 188/379 |
| 6,782,981 B2 | * | 8/2004 | Larmande | 188/379 |
| 6,837,345 B1 | * | 1/2005 | Lauble et al. | 188/378 |
| 6,883,653 B2 | * | 4/2005 | Kato et al. | 188/379 |
| 6,981,579 B2 | * | 1/2006 | Kuwayama et al. | 188/379 |

(Continued)

FOREIGN PATENT DOCUMENTS

JP          62-16841          1/1987

(Continued)

OTHER PUBLICATIONS

English Language Abstract of JP 2773004.

(Continued)

*Primary Examiner*—Robert A. Siconolfi
(74) *Attorney, Agent, or Firm*—Greenblum & Bernstein, P.L.C.

(57) ABSTRACT

In an engine mount (A) whose axis (X) is oriented in the front to rear direction of a vehicle, a damper weight (12) is embedded within a toroidal stopper rubber (10) fixed at its inner periphery to the rear end of an inner cylinder (2). The damper weight (12) is made of, for example, steel plate to have a spiral form and placed to surround the inner cylinder (2), thereby itself functioning as a spring in the direction of the axis (X). This structure can ensure a necessary mass for the damper weight while saving space, and prevent the occurrence of an uncomfortable shock when a stopper works.

4 Claims, 5 Drawing Sheets

U.S. PATENT DOCUMENTS

| | | | |
|---|---|---|---|
| 6,986,412 B2* | 1/2006 | Shimazaki et al. | 188/267 |
| 7,044,276 B2* | 5/2006 | Haneishi et al. | 188/379 |
| 2004/0040809 A1* | 3/2004 | Gustavsson | 188/379 |
| 2005/0051401 A1* | 3/2005 | Shimazaki et al. | 188/378 |
| 2005/0133325 A1* | 6/2005 | Kuwayama et al. | 188/379 |

FOREIGN PATENT DOCUMENTS

| | | |
|---|---|---|
| JP | 2-14855 | 1/1990 |
| JP | 4-4541 | 1/1992 |
| JP | 6-241278 | 8/1994 |
| JP | 2773004 | 4/1998 |

OTHER PUBLICATIONS

English Language Abstract of JP 6-241278.

* cited by examiner

VIBRATION ABSORBER WITH DYNAMIC DAMPER

CROSS-REFERENCES TO RELATED APPLICATIONS

This application claims priority under 35 USC 119 to Japanese Patent Application No. 2005-83495, filed on Mar. 23, 2005, the entire contents of which are incorporated herein by reference.

BACKGROUND OF THE INVENTION (a) Field of the Invention

This invention relates to cylindrical vibration absorbers mainly used as an engine mount or a suspension bush, and particularly relates to the technical filed of structures of cylindrical vibration absorbers with a dynamic dumper.

(b) Description of the Related Art

As an example of vibration absorbers of this kind, a vibration absorber is known which is formed by connecting inner and outer cylinders through an elastic element and in which a stopper mechanism for restricting relative axial movement of the inner and outer cylinders is provided at least at one axial end of the vibration absorber and a stopper rubber is placed for cushioning the shock caused by the action of the stopper mechanism. Such a vibration absorber is disclosed, for example, in Japanese Unexamined Utility-Model Publication No. S62-16841, Japanese Unexamined Utility-Model Publication No. H02-14855 and Japanese Patent No. 2773004.

In applications of vibration absorbers of this kind to engine mounts, a technique is known that restrains resonance vibrations by attaching a separate dynamic damper to the vibration absorber, resulting in reduced gear noise and booming noise and reduced transmission of idling vibrations. Such a technique is disclosed, for example, in Japanese Unexamined Patent Publication No. H06-241278.

The dynamic damper disclosed in the above document is formed by attaching a damper mass (damper weight) to a metal plate through a rubber, wherein the metal plate is fixed, by bolts or rivets, to a bracket that is fitted on the outer cylinder of the vibration absorber. Therefore, the entire dynamic damper extends radially outward from the outer periphery of the cylindrical vibration absorber. This not only invites a problem that the dynamic damper takes up space, but also takes a lot of trouble for assembly leading to cost rise of the vibration absorber.

On the other hand, as disclosed in Japanese Unexamined Utility-Model Publication No. H04-4541, a structure is proposed in which a dynamic damper is formed by disposing an elastic member at one axial end only of a cylindrical vibration absorber to connect to any one of the inner cylinder, the outer cylinder and the elastic element and attaching a damper weight to the elastic member.

SUMMARY OF THE INVENTION

However, in disposing a dynamic damper at one axial end of the cylindrical vibration absorber as in the proposed structure (Japanese Unexamined Utility-Model Publication No. H04-4541), a problem arises with how the dynamic damper coexists at the one axial end with the stopper rubber which should usually be disposed at that site. Even if various attempts are made to axially juxtapose these parts, space for both parts cannot be secured in many cases.

To cope with the above problem, it can be considered to embed a damper weight within a stopper rubber and use this structure as a dynamic damper. In this case, however, the following problem will arise. Damper weights are often made of metal to ensure a desired mass. When the damper weight in the stopper rubber impacts a counter stopper member (also made of metal in many cases) through the thin rubber layer of the stopper rubber, an uncomfortable shock will occur.

On the other hand, if the rubber layer is made thicker to avoid such an uncomfortable shock, the entire size of the stopper rubber will be correspondingly made greater. This invites a space problem as described above, or makes it impossible that the damper weight ensures a sufficiently great size, which fails to ensure a necessary mass to provide the intrinsic damping effect of the dynamic damper.

The present invention has been made in view of the above points, and its object is therefore to ensure a necessary mass for a damper weight of a dynamic damper disposed at one axial end of a cylindrical vibration absorber while saving space by contriving the structure of the dynamic damper and prevent an uncomfortable shock from occurring when a stopper works.

To achieve the above object, in the present invention, a spiral damper weight functioning also as an axial spring is embedded within a stopper rubber disposed at one axial end of a cylindrical vibration absorber.

More specifically, a first aspect of the invention is directed to a cylindrical vibration absorber that is formed by connecting an inner cylinder to an outer cylinder through an elastic element and is provided at least at one axial end with a stopper mechanism for restraining relative axial movement of the inner and outer cylinders to a predetermined amount or less. Further, the stopper mechanism has an annular stopper rubber with which any one of the inner cylinder, the outer cylinder and the elastic element is provided and which is placed to surround at least the inner cylinder, and a spiral damper weight is embedded within the stopper rubber to surround the inner cylinder in one or more turns, thereby forming an additional vibration system.

With this structure, when vibrations are input to the vibration absorber, an additional vibration system formed by the annular stopper rubber and its embedded damper weight functions as a dynamic damper to effectively absorb or attenuate vibrations in a frequency range determined by the structural characteristics of the additional vibration system (i.e., the mass of the damper weight, the spring rate of the stopper rubber and other characteristics).

On the other hand, when the inner and outer cylinders are comparatively largely moved in their axial direction relative to each other as by an external force and the relative movement is restrained by the action of the stopper mechanism, the stopper rubber impacts an axially adjacent member (e.g., stopper member). At this time of impact, the spiral damper weight in the stopper rubber functions as a spring, specifically, axially contracts to cushion the shock of impact.

Therefore, the cushion effect is exhibited not only by the rubber layer covering the damper weight but also by the damper weight itself. Accordingly, even if the rubber layer does not have a large thickness, the entire stopper rubber including the damper weight can reduce the shock of impact of the stopper rubber with the adjacent stopper member well, thereby preventing the occurrence of an uncomfortable shock.

Accordingly, this structure of the vibration absorber ensures a necessary mass for the damper weight without unnecessarily increasing the size of the stopper rubber and allows the entire stopper rubber to function well as a dynamic damper.

After the stopper mechanism works as described above, the stopper rubber is temporarily in contact with the stopper member or the like, which raises a concern that vibrations might be transmitted to the contacting member through the stopper rubber. However, the spiral damper weight functions as a spring as described above, so that the entire stopper rubber including the spiral damper weight exhibits a wide-ranging linear spring characteristic. Therefore, the transmission of vibrations in a specified frequency range can be effectively restrained by tuning the spring rate.

For example, when the vibration absorber is used as an engine mount for a vehicle, the spring rate of the entire stopper rubber may be tuned to absorb engine vibrations in a relatively high frequency range, such as vibrations during vehicle acceleration. In this case, even if the stopper mechanism works, the transmission of engine vibrations in the high frequency range can be well restrained to reduce booming noise in the vehicle interior.

In addition, in the above structure, the spiral damper weight is placed to surround the inner cylinder of the vibration absorber in one or more turns. Therefore, even if cracks occur in the rubber layer because of aged deterioration, the damper weight is hooked over the inner cylinder so that the stopper rubber does not drop off. Accordingly, it can be avoided that the unlikely drop of the stopper rubber leads to the impact of metal members of the stopper mechanism.

In the cylindrical vibration absorber having the above structure, a circumferential spiral groove is preferably formed in the outer periphery of the stopper rubber along the damper weight (a second aspect of the invention). Further, the damper weight is preferably made of metal (a third aspect of the invention).

When the above spiral groove is formed in the outer periphery of the stopper rubber, the action of the spiral damper weight as a spring becomes less likely to be interfered with the rubber layer. Further, when the damper weight is made of metal, its spring rate can be easily set, thereby providing a less variable spring rate. This facilitates the tuning of the spring rate of the entire stopper rubber and therefore provides the effects obtained by the tuning, such as vibration reduction, with stability.

Preferably, in the above cylindrical vibration absorber, a cylindrical member made of metal is adhered to the inner periphery of the annular stopper rubber by vulcanization and then fitted on one end of the inner cylinder, thereby assembling the stopper rubber to the vibration absorber (a fourth aspect of the invention). In this case, the stopper rubber can be assembled to the axial end of the vibration absorber with ease and reliability.

As described so far, in the cylindrical vibration absorber of the invention, a dynamic damper is formed using the stopper rubber disposed at one axial end thereof and the damper weight has a spiral form. Therefore, even when the rubber layer of the stopper rubber does not have a large thickness, the shock of impact when the stopper works can be well cushioned. As a result, the structure of the vibration absorber ensures a necessary mass for the damper weight while avoiding increase in size of the stopper rubber, and allows the entire stopper rubber to exhibit a sufficient function as a dynamic damper.

Further, it is possible to tune the spring rate of the entire stopper rubber so that vibrations in a specified frequency range are hard to transmit, by using the fact that the spiral damper weight gives the entire stopper rubber a wide-ranging linear spring characteristic. Therefore, noise and vibration can be effectively reduced even when the stopper works. In addition, the spiral damper weight can more certainly prevent the stopper rubber from dropping off because of aged deterioration.

Furthermore, when a circumferential spiral groove is formed in the outer periphery of the stopper rubber or the damper weight is made of metal, this facilitates the tuning of the spring rate of the entire stopper rubber and provides the effects due to the tuning with stability.

DETAILED DESCRIPTION OF THE INVENTION

Embodiments of the present invention will be described below in detail with reference to the drawings. The following description of the preferred embodiments is merely illustrative in nature and is not intended to limit the scope, applications and use of the invention.

Figure 1:
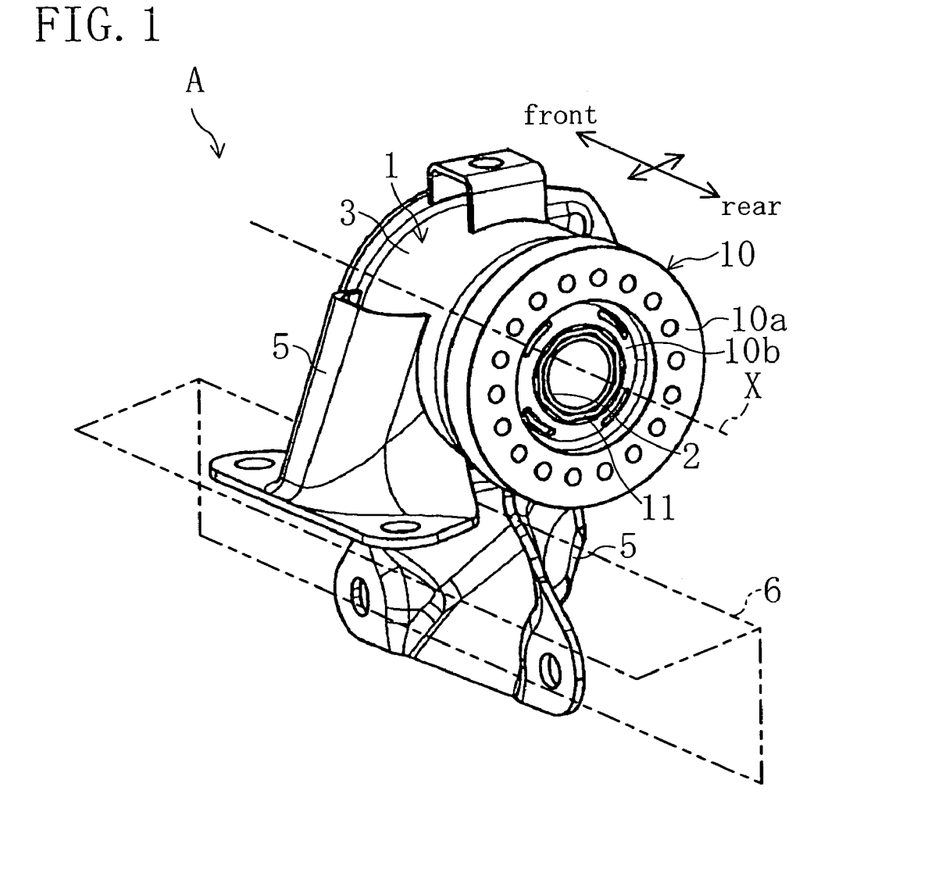
FIG. 1 is a perspective view showing the structure of an engine mount.
Figure 2:
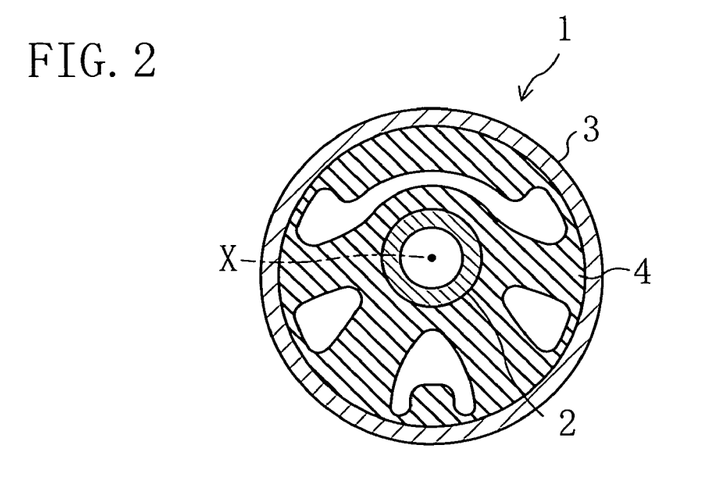
FIG. 2 is a transversal cross section showing the structure of a mount body.

FIGS. 1 and 2 show an embodiment in which a vibration absorber according to the invention is applied to an engine mount A for a vehicle. The engine mount A is interposed between an unshown vehicle power plant and a vehicle body and functions to support the load of the power plant and restrain the transmission of vibrations from the power plant to the vehicle body by absorbing or attenuating the vibrations from the power plant.

To be more specific, as shown in the transverse cross section in FIG. 2, a body 1 of the engine mount A of this embodiment is constructed so that inner and outer cylinders 2 and 3 are connected through a rubber elastic element 4. As shown in FIG. 1, the outer cylinder 3 is connected to a vehicle body frame 6 (shown in the imaginary lines) by two brackets 5 and 5 which are integrally attached to the outer periphery of the outer cylinder 3. On the other hand, the inner cylinder 2 is connected to the power plant by brackets (not shown) to which both ends of the inner cylinder 2 are fastened by bolts or the like.

FIG. 2 illustrates the state of the engine mount A on which acts no static load of the power plant. In this state, the center axis (axis) X of the inner cylinder 2 is offset above the center axis of the outer cylinder 3. On the other hand, in a state of the engine mount which is mounted on the vehicle body as described above and to which a static load of 1 G of the power plant is applied, the rubber elastic element 4 flexes to displace the inner cylinder 2 downward so that the center axis X of the inner cylinder 2 is almost aligned with the center axis of the outer cylinder 3, though it is not shown.

In this embodiment, the engine mount A is used by suspending the transmission end of the power plant, for example, horizontally mounted in an engine room. As shown in FIG. 1, the engine mount A is placed so that the axis X of the inner cylinder 2 extends substantially in the front to rear direction of the vehicle body (hereinafter, referred to simply as the front to rear direction). Further, at the rear end of the mount body 1 (one end thereof in the direction of axis X), a stopper rubber 10 is disposed for restraining relative movement of the inner and outer cylinders 2 and 3 beyond a certain amount in cooperation with a flange 31 of the outer cylinder 3 and an after-mentioned stopper member as described below.

Figure 3A:
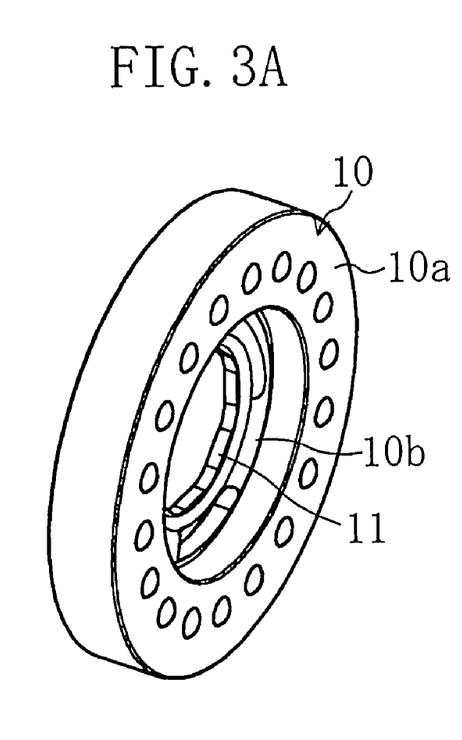
FIG. 3A is an enlarged perspective view showing a stopper rubber.
Figure 3B:
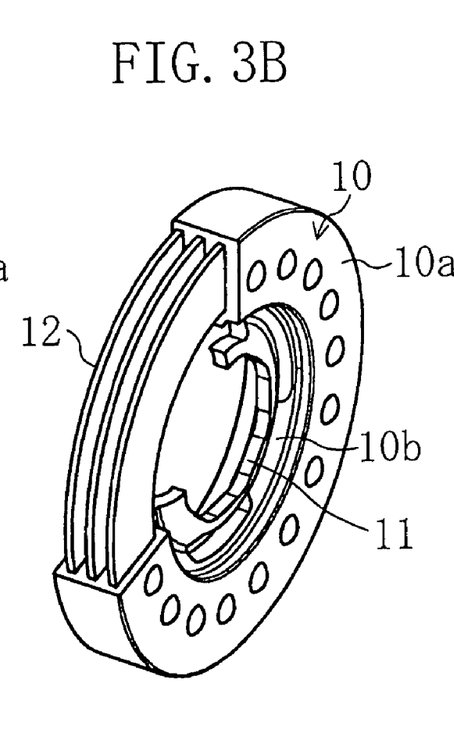
FIG. 3B is a perspective view showing the inner structure of the stopper rubber by partly cutting away it.

As shown enlarged in FIGS. 3A and 3B, the stopper rubber 10 is composed of a toroidal body portion 10a and a thin portion 10b formed on the inner periphery of the toroidal body portion 10a. Further, a cylindrical metal collar (cylindrical member) 11 of polygonal section (octagon in this embodiment) is adhered to the inner periphery of the thin portion 10b by vulcanization. The stopper rubber 10 is placed to surround one end of the inner cylinder 2 by fitting the collar 11 onto the one end of the inner cylinder 2.

Figure 4:
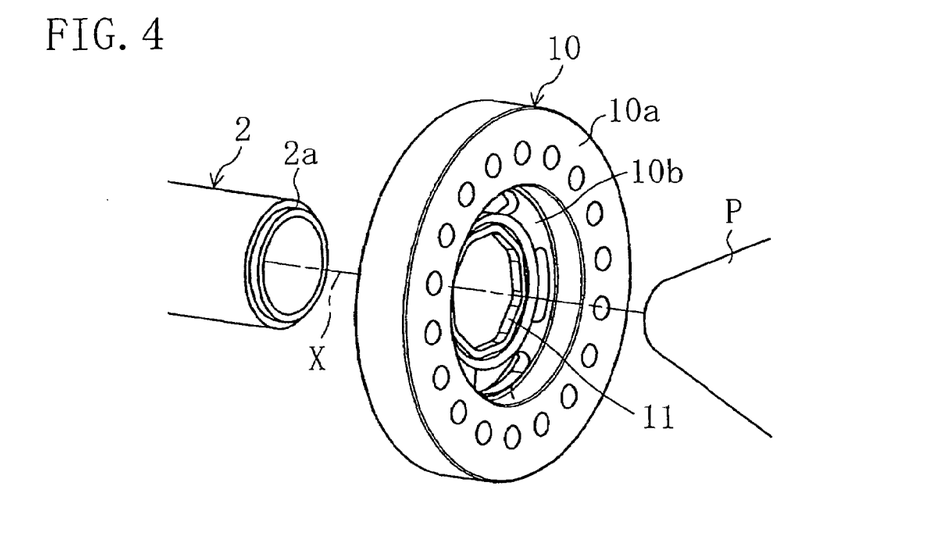
FIG. 4 is a perspective view showing how the stopper rubber is assembled to an inner cylinder.

More specifically, as shown in FIG. 4, the attachment of the stopper rubber 10 to the one end of the inner cylinder 2 can be implemented by inserting a small-diameter part 2a of the inner cylinder 2, which is located at the one end thereof, into the collar 11 of the stopper rubber 10 from one side (left side in the figure), pushing the tip end of a tapered punch P into the small-diameter part 2a from the other side and expanding the diameter of the small-diameter part 2a using the punch P. The small-diameter part 2a thus expanded in diameter extends along the inner periphery of the collar 11, thereby being fixed to it in tight fit.

Figure 5:
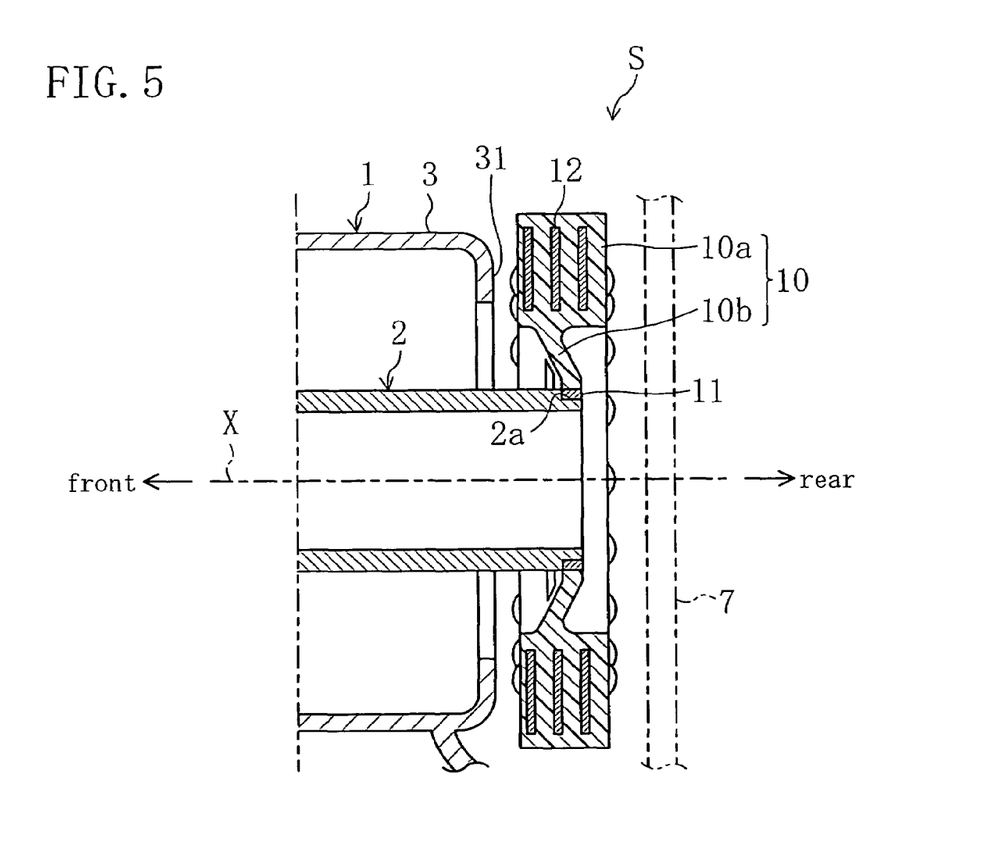
FIG. 5 is a cross section showing the structure of a stopper mechanism.

When the stopper rubber 10 is attached to the one end of the inner cylinder 2, its body portion 10a is located a predetermined distance apart from the rear surface of the annular flange 31 integrally formed at the rear end of the outer cylinder 3 as shown in FIG. 5 (the rubber elastic element 4 is not given in this figure). Further, stopper hardware 7 (shown in the imaginary lines in the figure) is likewise placed a distance apart from the rear surface of the body portion 10a of the stopper rubber 10.

The stopper hardware 7 may be provided by using part of an unshown bracket for the power plant or may be provided by hardware connected to the bracket. Alternatively, the stopper hardware 7 may be connected to the outer cylinder 3, its bracket 5 or the vehicle body member such as a vehicle body frame while avoiding the interference with the bracket for the power plant.

When the power plant oscillates to largely change the position of its upper part in the front to rear direction of the vehicle, for example, during rapid acceleration or deceleration of the vehicle, the inner cylinder 2 in the engine mount A also moves in the front to rear direction of the vehicle, i.e., moves axially relative to the outer cylinder 3. In this case, the body portion 10a of the stopper rubber 10 abuts the stopper hardware 7 or the outer cylinder flange 31 to restrain further movement of the inner cylinder 2.

In other words, in this embodiment, the flange 31 at the rear end of the outer cylinder 3, the stopper hardware 7 and the stopper rubber 10 constitutes a stopper mechanism S for restraining the relative axial movement of the inner and outer cylinders 2 and 3 to a predetermined amount or less. Further, a plurality of hemispherical bumps are formed circumferentially on each of the front and rear surfaces of the body portion 10a of the stopper rubber 10 (both end surfaces thereof in the direction of the axis X). The characteristics of the stopper can be tuned by the form, number and arrangement of the bumps.

Further, in this embodiment, as shown in FIGS. 3B and 5, a spiral damper weight 12 is embedded within the body portion 10a of the stopper rubber 10. Accordingly, with the edge of the thin portion 10a radially inward of the damper weight 12 fixed to the one end of the inner cylinder 2, an additional vibration system is formed which vibrates in the axial direction of the engine mount A so that, generally, the thin portion 10b acts as a spring element and the damper weight 12 acts as an inertial mass.

The additional vibration system functions as a dynamic damper for effectively absorbing or attenuating vibrations in a frequency range almost determined by the mass of the damper weight 12 and the spring rate of the thin portion 10b of the stopper rubber 10, out of such input vibrations as to relatively axially move the inner and outer cylinders 2 and 3. When, for example, the additional vibration system is tuned so that the frequency range includes relatively low frequencies, this can reduce the transmission of idling vibrations and effectively reduce booming noise in the vehicle interior produced at low and medium engine speeds and gear noise.

In order to set the characteristic value of the additional vibration system at low frequencies, the inertial mass must be relatively large and the spring must be relatively soft. Therefore, in this embodiment, the damper weight 12 is made of metal (e.g., steel plate because it can be made inexpensively) and a plurality of (four in this embodiment) mass-reduced parts are formed in the thin portion 10b of the stopper rubber 10. The damper weight 12 may be made of resin. The composition of the stopper rubber 10 is preferably NR/BR or NR/SBR, which provides relatively large vibration damping capacity and increased wear resistance.

Figure 3C:
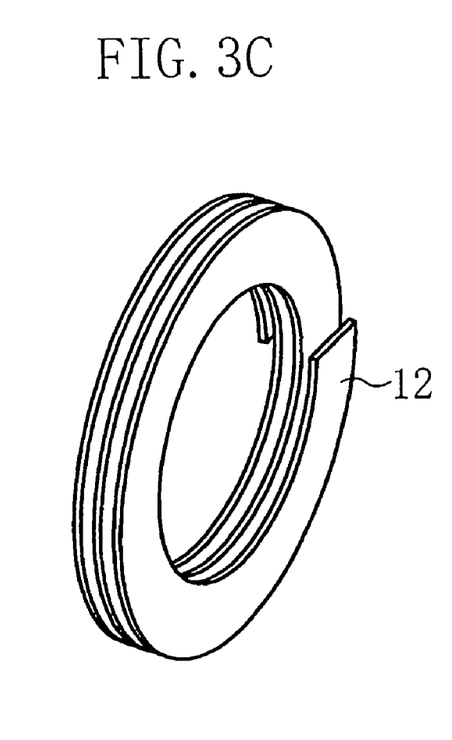
FIG. 3C is a perspective view showing a damper weight embedded within the stopper rubber.

As already described, in the engine mount A of this embodiment, a dynamic damper is formed by embedding the damper weight 12 within the body portion 10a of the stopper rubber 10, which provides effective cutoff of transmission of vibrations from the power plant. In addition, since the damper weight 12 has a spiral form as a feature of the present invention as shown in FIG. 3C, the above-mentioned characteristic as the stopper rubber 10 can be improved.

To be specific, in this embodiment, the damper weight 12 has the form of three turns of spiral surrounding the inner cylinder 2 and itself functions as a spring in the direction of the axis X of the inner cylinder 2. Therefore, when the stopper mechanism S works to allow the body portion 10a of the stopper rubber 10 to impact the stopper hardware 7 or the outer cylinder flange 31 which are adjacent in the direction of the axis X as described above, the shock of impact is cushioned also by axial contraction of the spiral damper weight 12. Accordingly, even when the rubber layer of the stopper rubber 10 does not have a large thickness, the occurrence of an uncomfortable shock can be prevented.

Figure 6:
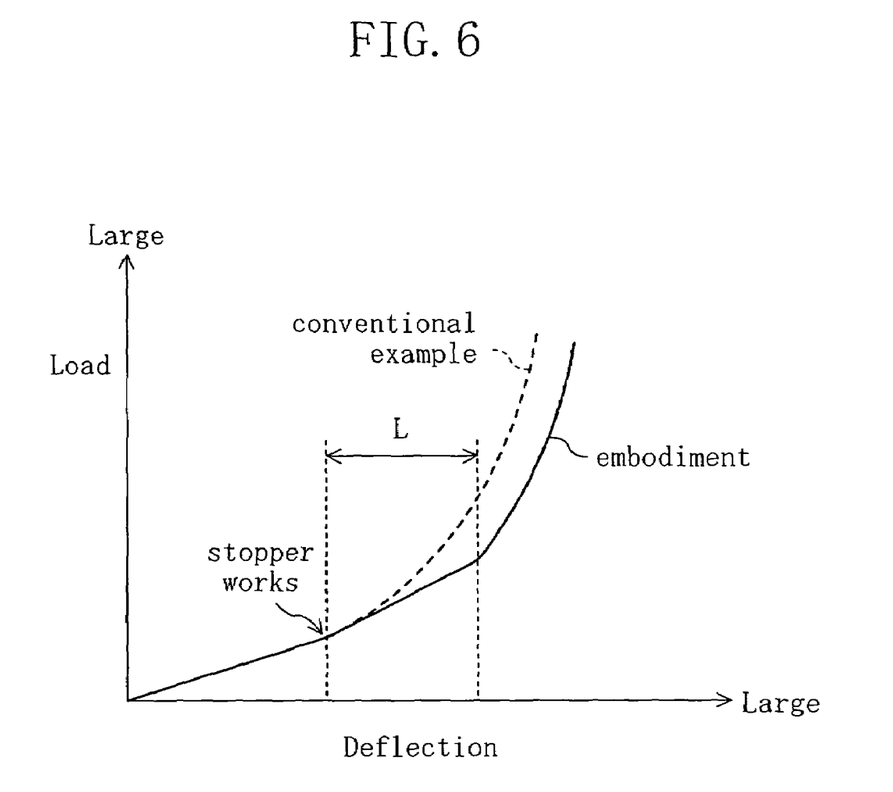
FIG. 6 is a load-deflection curve showing the change in spring rate before and after a stopper works.

Further, since the metal damper weight 12 functions as a spring, the spring characteristic of the entire stopper rubber 10 in the direction of the axis X has a wide-ranging linearity. Therefore, even after the stopper mechanism S works as described above, a linear region appears in the graph showing the spring rate of the engine mount A in the front to rear direction. FIG. 6 shows a load-deflection curve showing the continuous change of the static spring rate of the engine mount A in the front to rear direction before and after the stopper mechanism S works, for example, during acceleration of the vehicle.

The dash curve in the graph is a load-deflection curve of a conventional example of a typical stopper made fully of rubber and shows a non-linear characteristic in which the slope of the graph is gentle, i.e., the spring is soft, until the stopper works, but it abruptly rises when and after the stopper works. It can be seen from this that, with the typical stopper, the stiffness of the compressed stopper rubber abruptly increases (its dynamic spring rate abruptly increases) so that its vibration absorbing capacity is largely deteriorated also in a relatively high frequency range.

In contrast, with the stopper rubber of this embodiment, the slope of the graph (spring rate) does not abruptly change but a linear region (L) of substantially constant spring rate appears in the graph even when the stopper works, as shown in the solid curve in the graph. Therefore, since in this embodiment the dynamic spring rate in the front to rear direction never abruptly rises even when the stopper works unlike the above-described conventional example, it is possible to tune the spring rate of the entire stopper rubber to absorb engine vibrations in a relatively high frequency range, such as vibrations during vehicle acceleration.

Further, in this case, even when the power plant oscillates, for example, during rapid acceleration or deceleration of the vehicle as described above so that the inner cylinder 2 in the engine mount A is moved in the front to rear direction of the vehicle and the body portion 10a of the stopper rubber 10 abuts the stopper hardware 7 located to the rear (i.e., the stopper works), relatively high frequencies of vibrations generated by the engine at this time can be restrained from being transmitted through the stopper rubber 10 to the vehicle body, thereby reducing booming noise in the vehicle interior.

As described so far, in the engine mount A of this embodiment, a dynamic damper is formed using the stopper rubber 10 disposed at one axial end of the mount body 1 and the damper weight 12 embedded in the stopper rubber 10 has a spiral form to give the damper weight 12 itself the function of a spring. Therefore, even when the rubber layer of the stopper rubber 10 does not have a large thickness, the shock of impact when the stopper works can be well cushioned thereby preventing the occurrence of an uncomfortable shock.

With the above structure, the entire stopper rubber 10 does not have a large size and a necessary mass for the damper weight 12 can be ensured while space saving is achieved. Therefore, the entire stopper rubber 10 can sufficiently exhibit the intrinsic effect of the dynamic damper.

Further, it is possible to tune the spring rate of the entire stopper rubber 10 so that vibrations in a specified frequency range are hard to transmit, by using the fact that the spiral damper weight 12 gives the spring characteristic of the entire stopper rubber 10 its linearity. Therefore, an effective noise and vibration damping effect can be achieved even when the stopper works.

Furthermore, since the spiral damper weight 12 is placed to surround the inner cylinder 2, it does not drop off even in case of occurrence of cracks in the rubber layer of the stopper rubber 10 because of aged deterioration. Therefore, it can be avoided that metal members, such as the stopper hardware 7 and the inner cylinder flange 31, might impact each other.

OTHER EMBODIMENTS

The present invention is not limited to the above embodiment but includes various kinds of embodiments. For example, in the above embodiment, the stopper rubber 10 is disposed at one end of the inner cylinder 1. However, instead of this, the outer cylinder 3 or the rubber elastic element 4 may be provided with a stopper rubber. In the case where the rubber elastic element 4 is provided with a stopper rubber, the rubber elastic element 4 and the stopper rubber may be formed into an integral rubber layer.

Instead of disposing the stopper rubber 10 at the rear end of the mount body 1 as in the above embodiment, it may be disposed at the front end thereof or two stopper rubbers may be disposed at both the front and rear ends thereof.

In the above embodiment, the mount body 1 has a structure in which its inner cylinder 2 is connected to the power plant which is a source of vibration and its outer cylinder 3 is connected to the vehicle body to which it is supported. However, the mount body 1 may have a structure in which the former is connected to the vehicle body and the latter is connected to the power plant.

In the above embodiment, the cylindrical mount body 1 is horizontally placed so that its axial direction is matched with the front to rear direction of the vehicle. However, the orientation of the mount body 1 is not limited to the above. The present invention is applicable to a cylindrical engine mount placed so that its axial direction is matched with the vehicle width direction or a cylindrical engine mount placed so that its axial direction is matched with the vertical direction of the vehicle.

Figure 7A:
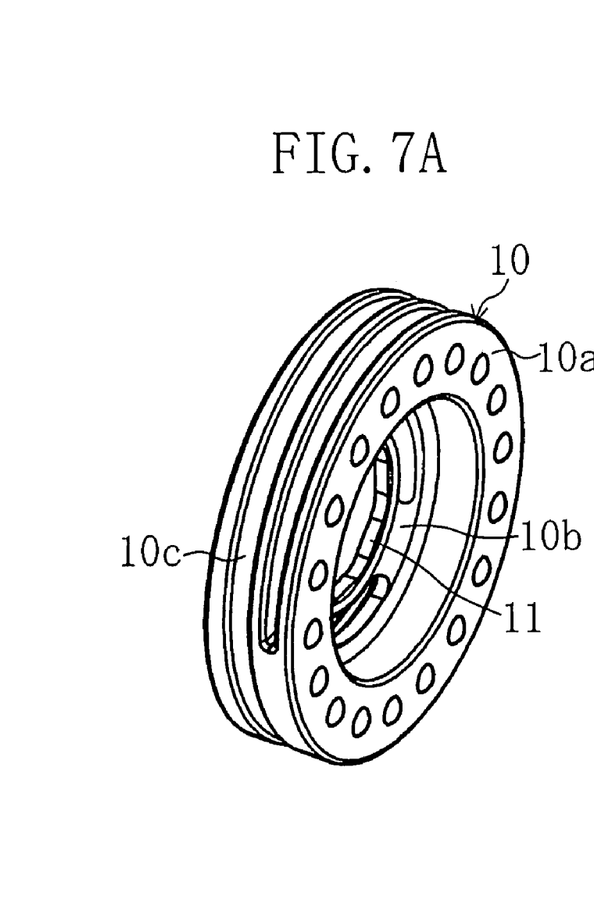
FIGS. 7A to 7C are corresponding diagrams to FIGS. 3A to 3C, showing another embodiment of the invention in which a spiral circumferential groove is formed in the outer periphery of a stopper rubber.
Figure 7B:
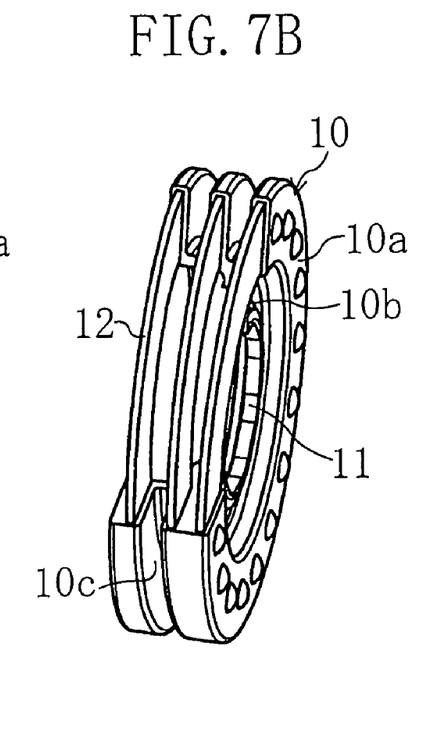
Figure 7C:
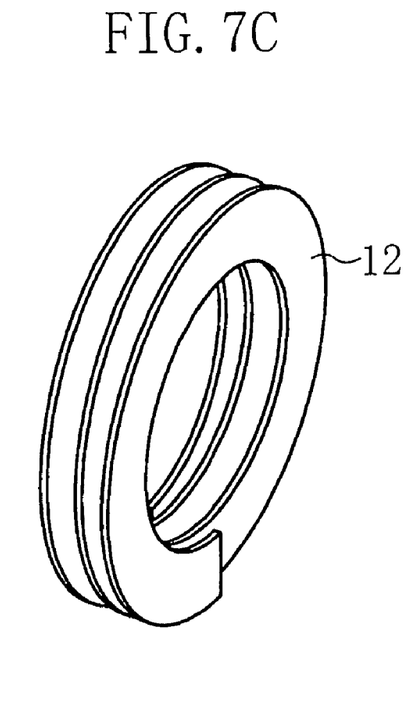

For the purpose of enhancing the spring function of the damper weight 12 embedded within the stopper rubber 10, a circumferential spiral groove 10c may be formed in the outer periphery of the stopper rubber 10 along the damper weight 12 embedded within the stopper rubber 10 as shown as an example in FIGS. 7A to 7C. In such a way, the action of the damper weight 12 as a spring becomes less likely to be interfered with by the rubber layer. This facilitates the setting of the spring rate of the entire stopper rubber 10 and reduction of variations in the spring rate.

Further, in the above embodiment, the vibration absorber of the present invention is applied to the engine mount A for a vehicle. However, the applications of the vibration absorber of the invention are not limited to the above but include various applications such as other engine mounts and suspension bushes for vehicles.

What is claimed is:

1. A cylindrical vibration absorber that is formed by connecting an inner cylinder to an outer cylinder through an elastic element and is provided at least at one axial end with a stopper mechanism for restraining relative axial movement of the inner and outer cylinders to a predetermined amount or less, wherein
    the stopper mechanism has an annular stopper rubber with which any one of the inner cylinder, the outer cylinder and the elastic element is provided and which is placed to surround at least the inner cylinder, and
    a spiral damper weight spring is embedded within the stopper rubber, said spiral damper weight spring having a coil shape and surrounding the inner cylinder in more than one turn, thereby functioning as a spring and forming an additional vibration system.

2. The vibration absorber of claim 1, wherein a circumferential spiral groove is formed in the outer periphery of the stopper rubber along the damper weight.

3. The vibration absorber of claim 1, wherein a cylindrical member made of metal is adhered to the inner periphery of the annular stopper rubber by vulcanization and fitted on one end of the inner cylinder.

4. The vibration absorber of claim 1, said spiral damper weight spring surrounding the inner cylinder in a plurality of coiled turns.

* * * * *